United States Patent
Miscopein et al.

(10) Patent No.: US 11,284,270 B2
(45) Date of Patent: Mar. 22, 2022

(54) METHOD FOR DYNAMIC SELECTION OF COMMUNICATION RESOURCES IN A HETEROGENEOUS TYPE CELLULAR NETWORK

(71) Applicant: Commissariat A L'Energie Atomique et aux Energies Alternatives, Paris (FR)

(72) Inventors: Benoit Miscopein, Grenoble (FR); Antonio De Domenico, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 149 days.

(21) Appl. No.: 16/681,973

(22) Filed: Nov. 13, 2019

(65) Prior Publication Data

US 2020/0162930 A1    May 21, 2020

(30) Foreign Application Priority Data

Nov. 15, 2018  (FR) ...................................... 18 60560

(51) Int. Cl.
*H04W 16/14*    (2009.01)
*H04L 1/20*    (2006.01)
(Continued)

(52) U.S. Cl.
CPC ............. *H04W 16/14* (2013.01); *H04L 1/203* (2013.01); *H04W 16/10* (2013.01); *H04W 72/02* (2013.01); *H04W 72/0446* (2013.01)

(58) Field of Classification Search
CPC ..... H04W 16/14; H04W 16/10; H04W 72/02; H04W 72/0446; H04W 72/082; H04L 1/203
See application file for complete search history.

(56) References Cited

U.S. PATENT DOCUMENTS 8,693,365 B1 * 4/2014 Phillips ................. H04W 28/18
  370/252
10,178,512 B2 * 1/2019 Meredith ................ H04W 4/06
(Continued)

FOREIGN PATENT DOCUMENTS

EP    2 833 661 A1    2/2015
EP    3 089 516 A1    11/2016

OTHER PUBLICATIONS

French Preliminary Search Report dated Jun. 11, 2019 in French Application 18 60560 filed on Nov. 15, 2018 (with English Translation of Categories of Cited Documents).
(Continued)

*Primary Examiner* — Michael Thier
*Assistant Examiner* — Nevena Zecevic Sandhu
(74) *Attorney, Agent, or Firm* — Oblon, McClelland, Maier & Neustadt, L.L.P.

(57) ABSTRACT

A method for selection of unlicensed transmission resources to set up a communication between a base station, such as a base station of a small cell of a heterogeneous cellular network, and a mobile terminal. The transmission resource is selected coherently by the base station and the mobile terminal from transmission quality indices for these resources. The quality index of a resource is determined by the base station (or the mobile terminal) from the state of at least one first counter of the base station (or the mobile terminal) associated with this resource. The first counter of the base station associated with a selected resource is incremented if the selected resource is available. The first counter of the mobile terminal associated with a selected resource is incremented if it receives a beacon signal on the selected resource.

10 Claims, 5 Drawing Sheets

(51) Int. Cl.
  *H04W 16/10* (2009.01)
  *H04W 72/02* (2009.01)
  *H04W 72/04* (2009.01)

(56) References Cited

U.S. PATENT DOCUMENTS

2003/0063619 A1* 4/2003 Montano ........... H04L 29/12018
  370/443
2013/0195036 A1* 8/2013 Quan ................. H04W 72/085
  370/329
2018/0054806 A1* 2/2018 Balachandran ..... H04W 72/042

OTHER PUBLICATIONS

Raschella, A, et al., "QoS Aware Radio Access Technology Selection Framework in Heterogeneous Networks using SDN", Journal of Communications and Networks, vol. 19, No. 6, Dec. 2017, pp. 577-586.
De Domenico, A, et al., "A Survey on MAC Strategies for Cognitive Radio Networks", IEEE Communications Surveys & Tutorials, vol. 14, No. 1. 2012, pp. 21-44.
Auer, P, et al., "Finite-time Analysis of the Multiarmed Bandit Problem", Machine Learning, 47, 2002, pp. 235-256.

* cited by examiner

METHOD FOR DYNAMIC SELECTION OF COMMUNICATION RESOURCES IN A HETEROGENEOUS TYPE CELLULAR NETWORK

TECHNICAL FIELD

This invention is generally applicable to the field of telecommunication systems in unlicensed bands. It is more particularly applicable to heterogeneous type cellular telecommunication systems, comprising macro-cells and small cells using unlicensed or only very slightly licensed frequency bands.

STATE OF PRIOR ART

Heterogeneous cellular telecommunications networks or Hetnets are one of the most promising solutions for the development of the next mobile telephony generation (5G). In general, a heterogeneous cellular network is composed of several tiers of cells: macrocells and small cells such as femtocells and picocells. A multi-RAT (multi Radio Access Technology) cellular network is composed of networks using different radio access technologies, for example Wi-Fi and 4G, these networks possibly using different frequency bands.

Another characteristic of 5G cellular networks will be to use unlicensed (in other words shared) spectral resources to face an ever-increasing traffic demand. Examples of such unlicensed resources include firstly the U-NII (Unlicensed National Information Infrastructure) band called the "5 GHz band" used by the recent Wi-Fi standards IEEE 802.11n and IEEE 802.11ac, and secondly the so-called White Space TV (TV-WS) band between 490 and 690 MHz (in the latter case, the term slightly licensed regime is used). Unlicensed resources will be accessed using cognitive radio strategies, in other words a communication in an unlicensed resource will only be allowed if it is available and does not disturb communication of other communication systems that are using it.

FIG. 1 diagrammatically shows a heterogeneous type of cellular telecommunication system. This system is composed of a layer of macro-cells (MC), superposed on a layer of small cells (SC). These small cells can use only LBSC (Licensed Band Small Cell) resources, or cognitively only ULBSC (Unlicensed Band Small Cell) resources, or a combination of unlicensed resources making use of different technologies, M-RAT SC (Multi-RAT Small Cell).

In such a heterogeneous network, a small cell making use of unlicensed resources must be capable of identifying which is the least occupied (band or channel corresponding to a fraction of a band) to be able to allocate it to a communication with a mobile terminal located in its coverage zone. Since the occupation of different resources varies with time, this allocation is usually dynamic: a resource allocated to a communication can become more loaded than another resource that has just been released. Therefore it is necessary that the small cell should inform the mobile terminal about the choice of the new allocated resource.

In a communication system that uses only licensed resources, the indication of the resource allocated to the terminal is generally notified to the terminal through a control channel. However, this technique is not well adapted to a telecommunication system using unlicensed bands because frequent changes to the allocation of resources will require a complex notification or the use of frequency/temporal resources for a control channel, which would always lead to an important traffic overload within the network.

Standard ECMA-392 ($2^{nd}$ edition, 2012) discloses a solution with notification of channel change for high-speed communications in TV-WS bands. According to this standard, the Medium Access Layer (MAC layer) uses superframes, each superframe being composed of a beacon period (BP), a Data Transfer Period (DTP) and a Contention Signalling Window (CSW) period. The beacon period can be used to transmit control information and particularly a channel change, if there is one. In the regulatory context of using TV-WS, base stations must periodically request temporary licenses to emit in a channel in the TV spectrum. If a channel becomes unavailable, a base station will be assigned a temporary new license for another channel and must notify this channel change to the mobile terminals that it serves. A specific beacon period field then informs the mobile terminals about the new channel in which the base station will operate and when the channel changeover will take place.

The solution recommended in standard ECMA-392 cannot be simply transposed to a heterogeneous cellular network for which the small cells use unlicensed frequency bands. If such a small cell were to operate in a channel already occupied by another system, it would have to change channel and inform the mobile terminals that it serves about this change. If the notification of the channel change is made by means (of the beacon field) of a superframe transmitted on this channel, this superframe might not be received by the mobile terminals due to the channel being occupied by a source of interference. The result is that the mobile terminals are desynchronised from the base station of the small cell after a certain time and start a procedure to search for beacons on all possible channels. Communications between the base station of the small cell and the mobile terminals are then interrupted, which significantly reduces the quality of service (QoS). Secondly, untimely and repeated scans of beacons by mobile terminals reduce the endurance of mobile terminal batteries.

Consequently, the purpose of this invention is to disclose a method for dynamic selection of unlicensed transmission resources in a telecommunication network, particularly in a heterogeneous type cellular network, which does not have the disadvantages mentioned above, namely that does not require a complex notification procedure or a traffic overload, and does not cause untimely interruptions to communications between base stations and mobile terminals.

PRESENTATION OF THE INVENTION

This invention is defined by a system for dynamic selection of transmission resources between a base station, and particularly a base station of a small cell in a heterogeneous cellular network, and a mobile terminal, the base station being able to establish a link with the mobile terminal by accessing said transmission resources cognitively, wherein:

each of the base station and the terminal have at least one counter associated with each of the transmission resources, the state of the first counter being characteristic of the availability of the transmission resource with which it is associated, the base station and the mobile terminal calculating a transmission quality index for each transmission resource starting from the state of the first counter and selecting the transmission resource with the highest index;

the base station determining if the selected transmission resource is available, and if it is, incrementing its first counter and then transmitting the state of this counter to the mobile terminal using a beacon signal of a superframe on the selected transmission resource, and if not, not incrementing its first counter and not transmitting data on said link;

the mobile terminal determining if a beacon signal is present on the selected transmission resource and if it is, incrementing its first counter, and if it is not, not incrementing its first counter and not receiving data on said link;

such that the base station and the mobile terminal select the same transmission resource (SC-Ch(t)) to support the link.

Advantageously, the first counter of the base station is incremented if the signal level on the transmission resource with which it is associated is less than a predetermined threshold, and otherwise it is not incremented.

According to a first example embodiment, the quality index of a transmission resource is estimated at the base station (or the mobile terminal) as the state of the first counter of the base station (or the mobile terminal) associated with said resource.

According to a second example embodiment, the quality index of a transmission resource is estimated at the base station (or the mobile terminal) from a prediction function (F) having the state of the first counter of the base station (or the mobile terminal) associated with said resource as predictive variable, said prediction function being identical for the base station and for the mobile terminal.

Each of the base station and the terminal preferably have at least one second counter associated with each transmission resource, the transmission quality index of a transmission resource being estimated at the base station (or the mobile terminal) from a prediction function having the states of the first and second counters respectively of the base station (or the mobile terminal), as predictive variables.

In this case, when the base station determines that the selected transmission resource is not available, it increments its second counter associated with this resource, and when the mobile terminal determines that the beacon signal is not present on the selected transmission resource, it increments its second counter associated with this resource.

The quality index of a transmission resource can be calculated by the base station (or by the mobile terminal) as $$\frac{C_1}{C_1+C_2}$$

in which $C_1$ is the state of the first counter of the base station (or the mobile terminal) and $C_2$ is the state of the second counter of the base station (or the mobile terminal).

Alternatively, the quality index of a transmission resource can be calculated by the base station (or by the mobile terminal) as $$\frac{C_1}{C_1+C_2}+\alpha\sqrt{\frac{\log t}{C_1+C_2}}$$

in which $C_1$ is the state of the first counter of the base station (or the mobile terminal) and $C_2$ is the state of the second counter of the base station (or the mobile terminal), $\alpha$ is a positive parameter and t is a temporal index incremented at each superframe.

Advantageously, when the base station (or the mobile terminal) determines that the error rate on the selected transmission resource is higher than a predetermined threshold value, it increments its second counter associated with this resource.

The quality index of a transmission resource can then be calculated by the base station (or by the mobile terminal) as $$\frac{C_1}{C_1+C'_2}$$

in which $C_1$ is the state of the first counter of the base station (or the mobile terminal) and $C'_2$ is the state of the second counter of the base station (or the mobile terminal).

BRIEF DESCRIPTION OF THE DRAWINGS

Other characteristics and advantages of the invention will become clear after reading a preferred embodiment of the invention, described with reference to the appended figures among which.

DETAILED PRESENTATION OF PARTICULAR EMBODIMENTS

In the following, we will consider a network using unlicensed or slightly licensed transmission resources. Without losing any generality, we will assume that this network is a cellular network comprising a layer of macro-cells using licensed spectral resources and a layer of small cells (SCs) using unlicensed or slightly licensed spectral resources.

Unlicensed (or free) transmission resources refers to transmission resources (frequency bands or channels) shared with another radio system (for example a telecommunication network deployed in the same zone). Slightly licensed transmission resources means that all or some transmission resources are shared with a primary system (TV broadcasting, radar), to which these resources are already assigned and that are priority accesses to the resource. In the following, it will be understood that the term "unlicensed transmission resource" covers these two cases.

A small cell can cognitively transmit by means of a transmission resource that is exceptionally or temporarily unoccupied by another radio system (primary or not). Before being able to transmit on such a resource, the small cell must determine if it is already occupied by a second radio system or is already used by another cognitive communication (for example between the base station of a neighbouring mini-cell and a mobile terminal).

The basic concept of this invention is to provide a mechanism for dynamic selection of transmission resources, executed in parallel and independently by a mobile terminal and by the base station of the small cell that serves it. This mechanism uses one or several counters at the base station and one or several corresponding counters at the mobile terminal. The state of this or these counters is such that the base station and the mobile terminal can independently evaluate the quality of the different transmission resources in the same manner, and determine which of them will give the best support to the link between the base station and the mobile terminal.

In the following, we will study a communication between a mobile terminal and the base station of a mini-cell within a heterogeneous type of network.

Figure 1:
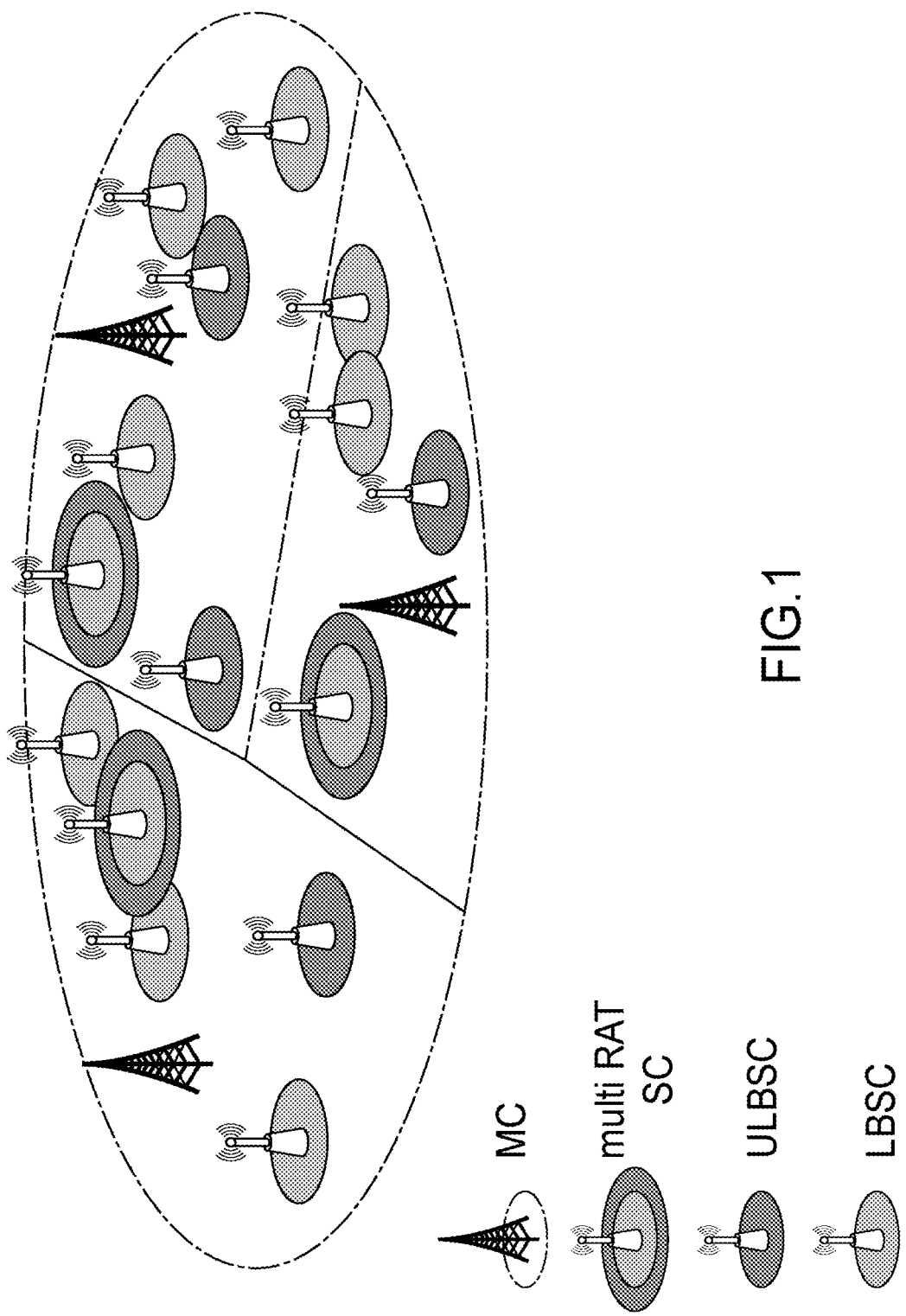
FIG. 1 diagrammatically shows a heterogeneous type of cellular telecommunication system.
Figure 2A:
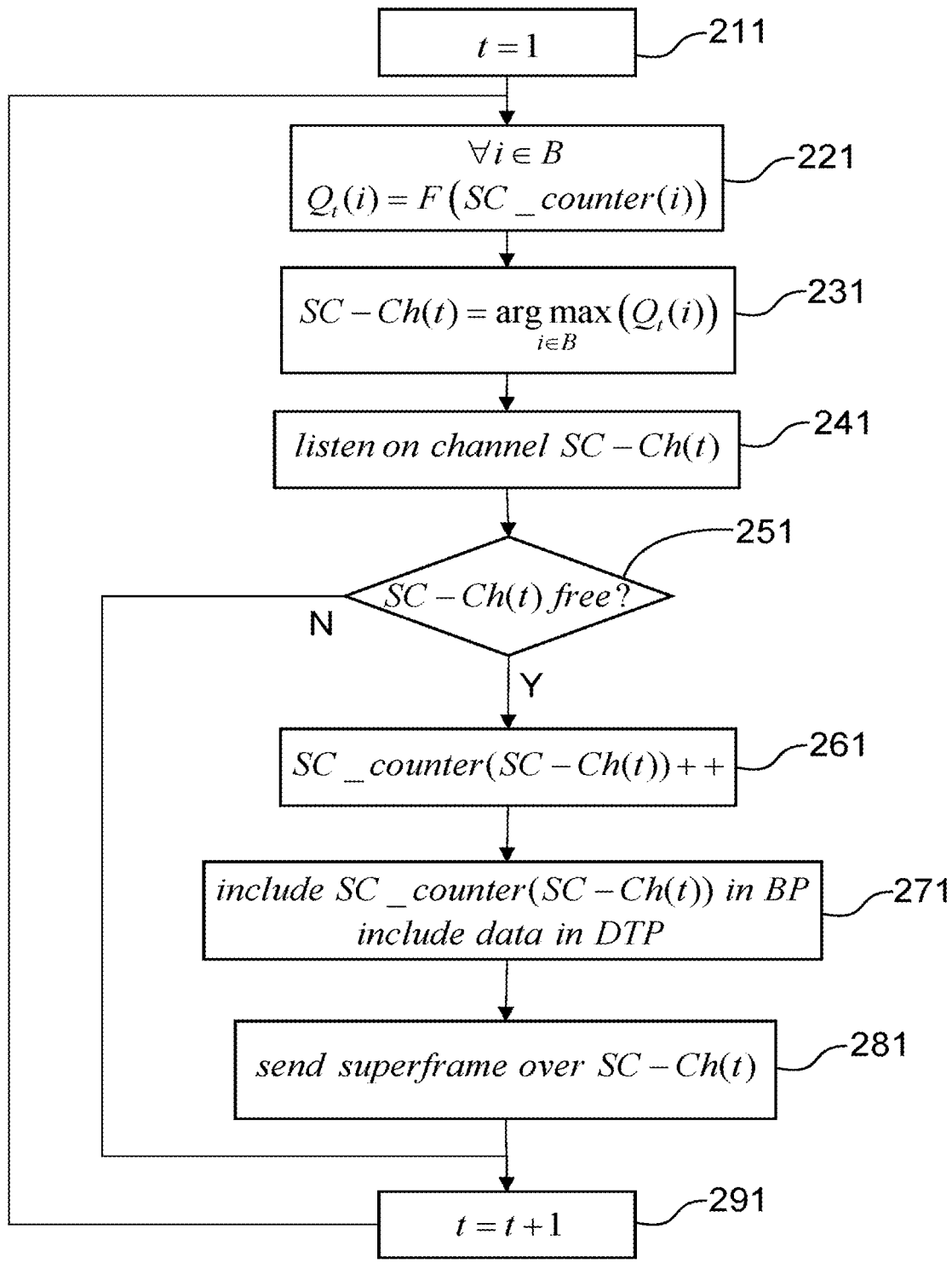
FIG. 2A represents a first sequence of steps performed by a base station making use of a method of dynamic selection of transmission resources according to a first embodiment of the invention.

FIG. 2A represents a first sequence of steps in a method of dynamic selection of unlicensed transmission resources according to a first embodiment of the invention, in the form of a flowchart. This first sequence of steps is executed by the base station BS of the mini-cell SC.

In step 211, the time index t is initialised, in this case to the value 1. This index may for example be incremented at the repetition frequency of superframes, as will be described later. Initialisation can be programmed when a communication has to be set up or during a hand over procedure.

Unlicensed transmission resources that may cognitively be available to the mini-cell SC are indexed herein by $i \in B$, where B designates all these resources. For example, transmission resources can be spectral bands, sub-bands or transmission channels within a spectral band, sub-carrier groups in an OFDM multiplex. It is assumed that a counter, SC_counter(i), is associated with each of these resources.

In step 221, the base station BS of the mini-cell calculates a transmission quality index for each of resources $i \in B$, denoted $Q_t(i)$, starting from the current state of the counter SC_counter(i) associated with this resource:

$$Q_t(i) = F(SC\_counter(i)) \qquad (1)$$

in which F is a function that will be described in detail later.

In step 231, the base station BS determines the transmission resource, noted SC-Ch(t), that has the highest quality index, namely:

$$SC - Ch(t) = \arg\max_{i \in B}(Q_t(i)) \qquad (2)$$

It will be understood that this selection is dynamic in that the quality indices of each of the different transmission resources vary in time.

The base station selects the resource SC-Ch(t) and in 241 it determines if it is available by detecting if a transmission is already present on it. In other words, the receiver does a sensing on the resource concerned and determines, for example, if the received signal level is stronger than a predetermined threshold. Alternatively, other spectral detection techniques can be used, as described in the paper by A. De Domenico et al. entitled "A Survey on MAC Strategies for Cognitive Radio Networks," in IEEE Communications Surveys & Tutorials, vol. 14, No. 1, pp. 21-44, 2012.

If the transmission resource is already occupied (signal present), the process terminates at 291. In other words, the base station of the mini-cell SC does not transmit data to the mobile terminal using the selected resource and the quality indices of the different transmission resources are not evaluated before the next superframe.

On the other hand, if the resource SC-Ch(t) is free, the base station increments the counter for this resource, SC_counter(SC-Ch(t)), in 261. In 271, it then includes the state of this counter in the beacon field, BP, and the data addressed to the mobile terminal in the DTP field of the superframe. The latter is transmitted on the resource SC-Ch(t) in 281.

The temporal index is finally incremented in 291 and the process for dynamic selection of the transmission resource is repeated at the next superframe.

Figure 2B:
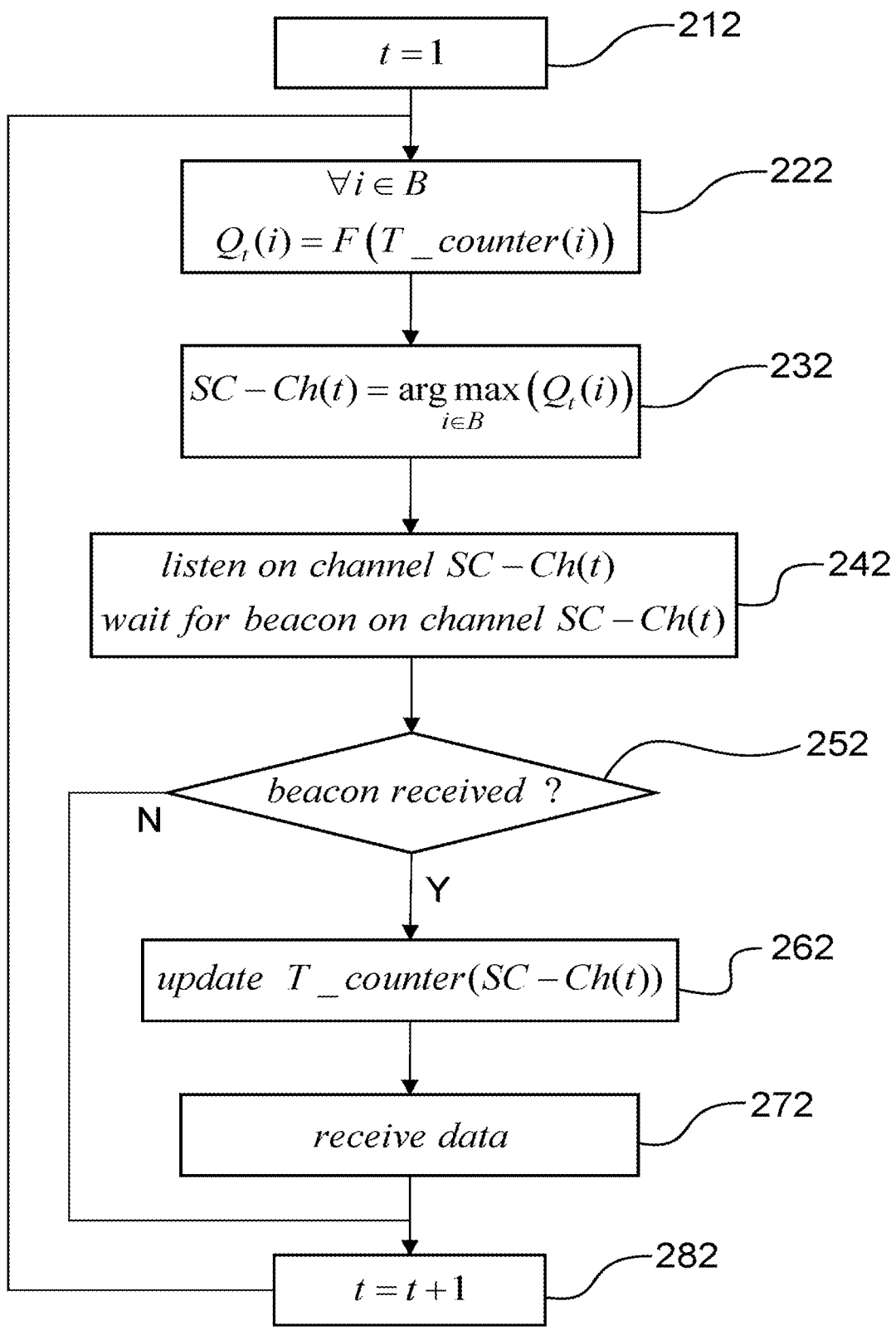
FIG. 2B represents a first sequence of steps performed by a mobile terminal, making use of a method of dynamic selection of transmission resources according to a first embodiment of the invention.

FIG. 2B represents a second sequence of steps in a method of dynamic selection of unlicensed transmission resources according to a first embodiment of the invention, in the form of a flowchart. This second sequence of steps is executed by a mobile terminal in parallel to the sequence executed on the base station in FIG. 2A.

Steps 212 to 232 are identical to steps 211 to 231 described above. More precisely, a temporal index is initialised in 212 when the communication s set up. This index is incremented in 282 at the same frequency as that incrementing the index t in 281, for example at the superframe recurrence frequency. A counter T_counter(i) is associated with each of the transmission resources $i \in B$.

In step 222, the mobile terminal calculates the transmission quality index for each of the resources $i \in B$, denoted $Q_t(i)$ starting from the current state of the counter T_counter(i) associated with this resource, namely:

$$Q_t(i) = F(T\_counter(i)) \qquad (3)$$

in which the function F is identical to that used at the base station. We will see below that the state of the counter T_counter(i) is identical to the state of the counter SC_counter(i) and consequently the quality indices $Q_1(i)$ of the different transmission resources are the same as those calculated by the base station. This justifies use of the same notation to designate them.

In step 232, the mobile terminal determines the transmission resource noted SC-Ch(t), that has the highest quality index, as in expression (2).

The mobile terminal receiver selects the resource SC-Ch(t) and waits for reception of the beacon signal on this channel, at 242.

If no beacon signal, and consequently no superframe addressed to the mobile terminal, is received, the mobile terminal goes onto step 282. More precisely, the absence of the beacon signal will be observed after a duration timeout. In this case, the mobile terminal waits for the next superframe to evaluate the quality indices of the different transmission resources once again.

On the other hand, if the beacon signal is detected, the counter T_counter(SC-Ch(t)), associated with the selected transmission resource, is updated with the state of the counter transmitted by the base station in the BS field of the superframe. Alternatively, it can be simply incremented. The data are recovered from the DTP part of the superframe.

In both cases, the temporal index is incremented in 282 and the process for dynamic selection of the transmission resource is repeated at the next superframe.

As can be observed, the result considering the two factors is:

Either the selected resource is occupied and the counter SC_counter(SC-Ch(t)) is not incremented, the superframe containing the state of the counter (and the data, if any) is not sent. Consequently, the beacon signal is not received and the counter T_counter(SC-Ch(t)) is not incremented. In the next superframe, the base station and the terminal will select a new transmission resource, SC-Ch(t+1), with a better quality index. Since this choice is based on the same counter states and the same function F, the selection will be consistent between the base station and the terminal.

Or the selected resource is free, the counter SC_counter (SC-Ch(t)) is incremented, the superframe containing the state of the counter (and the data, if any) is sent by the base station. The beacon signal is received by the mobile terminal on the selected channel and the counter T_counter(SC-Ch (t)) is updated, or is equivalently incremented. Thus, the counters mentioned above have the same state at the end of the process and the dynamic selection of the transmission resource is once again coherent in the next superframe. In all cases, the selected transmission resource is used to support the link between the base station and the mobile terminal.

The F function can be simply the identity, in which case the quality index is simply the state of the counters, SC_counter(SC-Ch(t)), T_counter(SC-Ch(t)). Alternatively it could be a low pass filter with an omission factor so as to give greater weight to recent measurements than to old measurements. In general, it could be a prediction function estimating the quality index of the resource as a function of previous measurements.

Figure 3A:
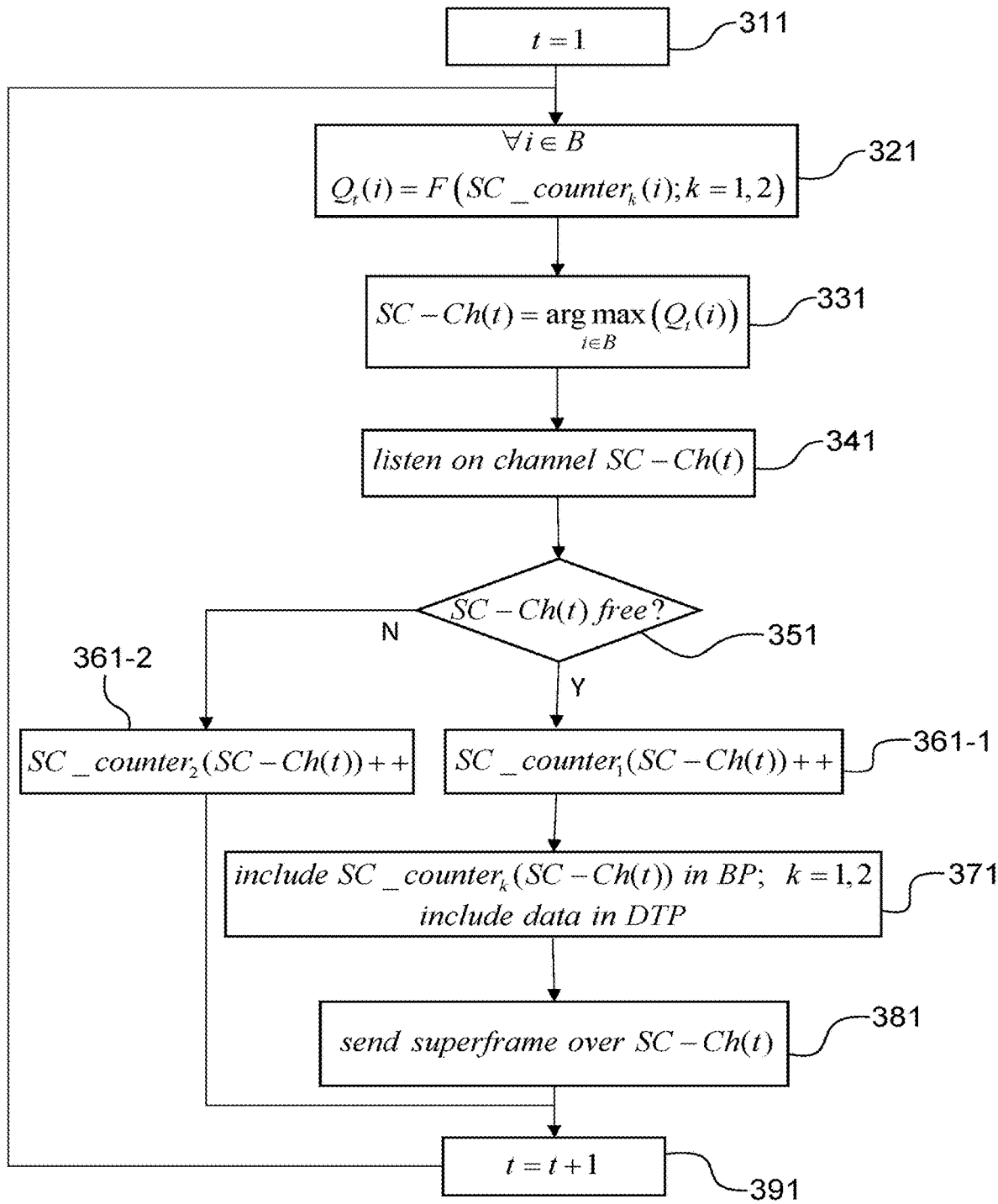
FIG. 3A represents a first sequence of steps performed by a base station, making use of a method of dynamic selection of transmission resources according to a second embodiment of the invention.

FIG. 3A represents a first sequence of steps in a method of dynamic selection of unlicensed transmission resources according to a second embodiment of the invention, in the form of a flowchart. This first sequence of steps is executed by the base station of the mini-cell.

This second embodiment is different from the first in that in this case the quality index is calculating making use of a plurality K of counters for each transmission resource, these counters being characteristic of the state of availability of this resource.

As before, the dynamic transmission resource selection process begins with an initialisation of the temporal index in 311. The counters associated with the different resources are also initialised to a given non-zero value.

The quality index, $Q_t(i)$, of each transmission resource, i $\in$ B, is then calculated in 321 starting from the states of the counters associated with this resource:

$$Q_t(i)=F(SC\_counter_k(i);k=1,\ldots,K) \quad (4)$$

Without losing any generality, it will be assumed in the following that K=2.

The transmission resource with the highest quality index is selected in 331. In 351, the base station determines if this resource is available by detecting in 341 if a transmission is already present in it, as in the first embodiment.

If the transmission resource is free, a first counter $SC\_counter_1(SC-Ch(t))$ is incremented in 361-1. The state of the two counters is then included in the beacon part BP and the data to be transmitted are included in the DTP part of the superframe in 371. Alternatively, the state of the first counter and the sum of the states of the first and second counters are included in the beacon part BP. In both cases, the superframe thus formed is transmitted in 381 on the selected transmission resource.

On the other hand, if the transmission resource is occupied, a second counter $BS\_counter_2(SC-Ch(t))$ is incremented in 361-2.

In both cases, the temporal index is incremented in 391 and the dynamic selection process is repeated at the next superframe.

Figure 3B:
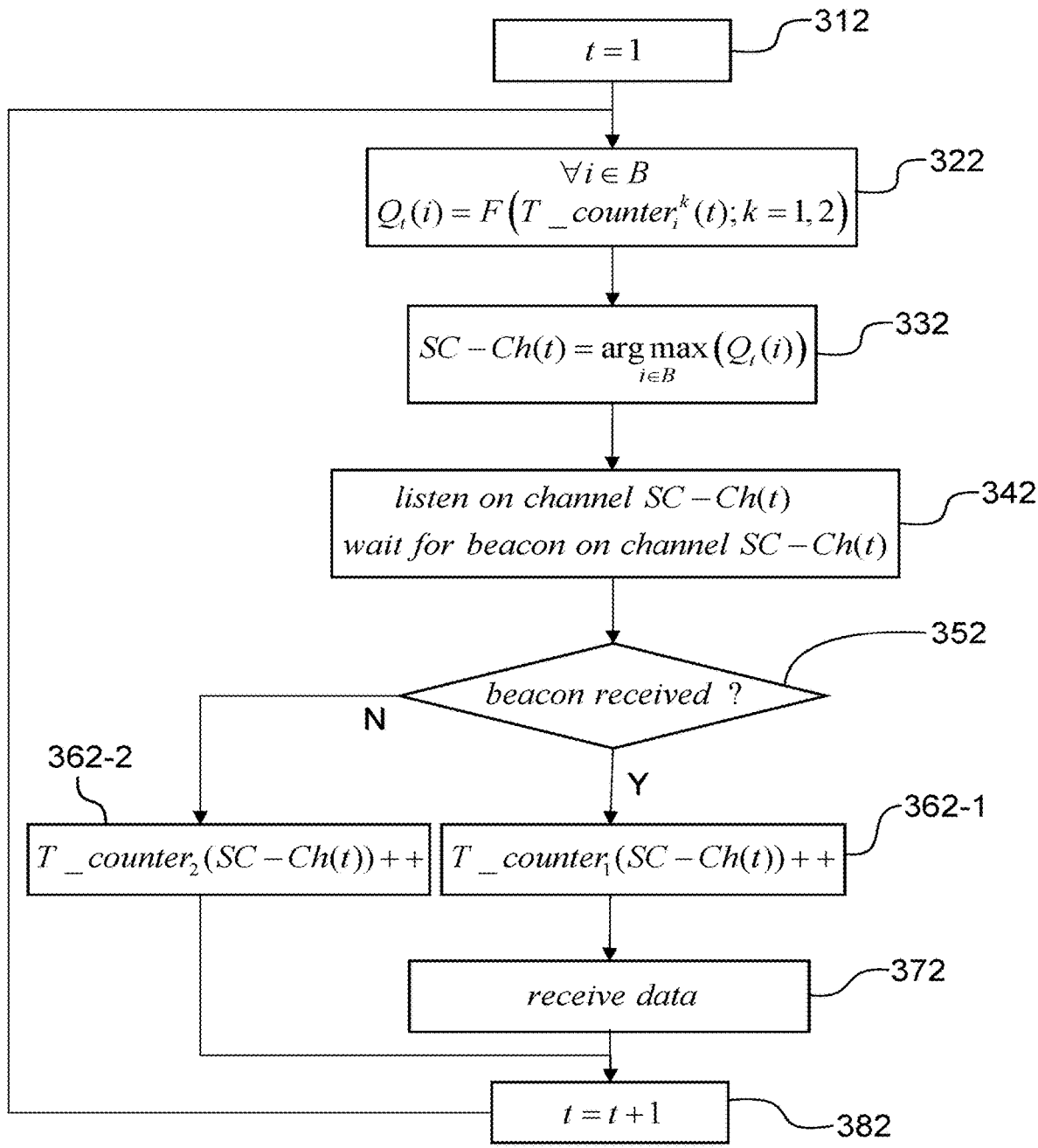
FIG. 3B represents a second sequence of steps performed by a mobile terminal, making use of a method of dynamic selection of transmission resources according to a second embodiment of the invention.

FIG. 3B represents a second sequence of steps in a method of dynamic selection of unlicensed transmission resources according to the second embodiment of the invention, in the form of a flowchart. This second sequence of steps is performed by the mobile terminal located in the coverage zone of the mini-cell.

Once again, the transmission resource selection process according to the second embodiment is different from the first in that a plurality K of counters is considered to calculate the quality index of a resource.

The process begins with an initialisation of the temporal index in 312. The counters associated with the different resources are also initialised to a given non-zero value, identical to the initialisation value of the base station.

The quality index, $Q_t(i)$, of each transmission resource, i $\in$ B, is then calculated in 322 starting from the current states of counters associated with this resource:

$$Q_t(i)=F(T\_counter_t^k(t);k=1,\ldots,K) \quad (5)$$

in which the function F is identical to that used at the base station

The mobile terminal receiver selects the resource SC-Ch (t) and waits for reception of the beacon signal on this channel, at 342.

If the beacon signal is detected in 352, the first counter $T\_counter_1(SC-Ch(t))$, associated with the selected transmission resource, is incremented in 362-1. The data are recovered from the DTP part of the superframe in 372.

On the other hand, if no beacon signal and consequently no superframe addressed to the mobile terminal is received on the selected resource, the second counter $T\_counter_2(SC-Ch(t))$, associated with the selected transmission resource, is incremented in 362-2. The absence of the beacon signal will be observed, for example, after a duration timeout.

In both cases, the temporal index is incremented in 382 and the process for dynamic selection of the transmission resource is repeated at the next superframe.

As in the first embodiment, the states of counters associated with a resource are identical for the base station and the mobile terminal. The result is a coherent dynamic selection of the transmission resource between the two entities, regardless of the temporal index.

According to a first variant of the second embodiment, the F function can be defined as follows:

$$F(C_1, C_2) = \frac{C_1}{C_1 + C_2} \quad (6)$$

wherein $C_1$ and $C_2$ represent the states of the first counter and the second counter respectively (of the base station/ mobile terminal). Thus, according to this variant, the quality index is the fraction of the number of times that the selected resource was determined as being free relative to the number of times that it was selected.

According to a second variant, the F function can be defined as follows:

$$F(C_1, C'_2) = \frac{C_1}{C_1 + C'_2} \quad (7)$$

in which $C_1$ and $C'_2$ represent the state of the first counter (of the base station/mobile terminal) and the state of a second counter incremented either if the selected transmission resource is occupied (signal level higher than a threshold value), or if the percentage of data received correctly on this resource is less than a given threshold, respectively. The inverse of the error rate on the selected resource can be used instead of the percentage of correctly received data. However, it should be noted that in this case, the percentage of correct data/the error rate is not measured during a channel listening operation, but after a step for reception of data extracted from a previous superframe on the selected transmission resource. This information is available at the base station after reception of or a received information acknowledgement packet sent by the terminal.

According to a third variant, a so-called UCB approach is used that is described in the paper by P. Auer et al. entitled "Finite-time analysis of the multiarmed bandit problem", published in Machine Learning, vol. 47, pp. 235-256, 2002. According to this approach, the reward that can be expected by the selection of each transmission resource is calculated:

$$F(C_1, C_2, t) = \frac{C_1}{C_1 + C_2} + \alpha \sqrt{\frac{\log t}{C_1 + C_2}} \tag{8}$$

in which $C_1$ and $C_2$ represent the state of the first counter and the state of the second counter (of the base station/mobile terminal) respectively, t being the temporal index, $\alpha$ is a positive parameter, the term $$\alpha \sqrt{\frac{\log t}{C_1 + C_2}}$$

being the bias chosen to have a logarithmic decay of the regret. The first term of the sum represents the knowledge that the system has of the quality of the channel while the second term gets the system to explore new radio channels.

More generally, the F function supplying the quality index may be a prediction function using counters associated with the transmission resource, $C_k^i$, k=1, . . . ,K, and possibly the temporal index t as predictive variables, the prediction function possibly being obtained by means of supervised or unsupervised learning. It could also be envisaged to obtain the transmission resource SC-Ch(t) with the highest quality index directly from an extended prediction function, $\bar{F}$, using all counters associated with transmission resources $C_k^i$; k=1, . . . ,K,; i$\in$ B and possibly the temporal index t, as predictive variables:

$$SC\text{-}Ch(t) = \bar{F}(C_k^i; k=1, \ldots, K; i \in B) \tag{9}$$

the extended prediction function possibly once again being obtained by means of supervised or unsupervised learning.

The invention claimed is:

1. A system for dynamic selection of a plurality of transmission resources between a base station of a cell in a heterogeneous cellular network and a mobile terminal, the base station being configured to establish a link with the mobile terminal by accessing the plurality of transmission resources cognitively, wherein:
    each of the base station and the mobile terminal have at least one first counter respectively associated with each of the plurality of transmission resources, a state of each first counter of the mobile terminal and a state of each first counter of the base station being characteristic of an availability of a corresponding transmission resource of the plurality of transmission resources with which the each first counter of the mobile terminal and the each first counter of the base station are associated, the base station and the mobile terminal each being configured to calculate a transmission quality index for a transmission resource of the plurality of transmission resources starting from a state of a first counter of the mobile terminal and a state of a first counter of the base station, and to select a certain transmission resource, of the plurality of transmission resources, with a highest index;
    the base station is configured to determine if the selected certain transmission resource is available, and if so, increment the first counter of the base station corresponding to the selected certain transmission resource and then transmit the state of the first counter of the base station corresponding to the selected certain transmission resource to the mobile terminal using a beacon signal of a superframe on the selected certain transmission resource, and if not, not increment the first counter of the base station and not transmit data on the link; and
    the mobile terminal is configured to determine if the beacon signal is present on the selected certain transmission resource and if so, increment the first counter of the mobile terminal corresponding to the selected certain transmission resource, and if not, not increment the first counter of the mobile terminal corresponding to the selected certain transmission resource, and not receive the data on the link, such that the base station and the mobile terminal select a same transmission resource to support the link.

2. The system for dynamic selection of transmission resources according to claim 1, wherein the base station is further configured to increment the first counter of the base station corresponding to the selected certain transmission resource when a signal level on the selected certain transmission resource is less than a predetermined threshold, and otherwise not increment the first counter of the base station.

3. The system for dynamic selection of transmission resources according to claim 2, wherein the base station and the mobile terminal are each configured to estimate the transmission quality index of the selected certain transmission resource as the state of the particular first counter of the base station and the state of the first counter of the mobile terminal corresponding to the selected certain transmission resource.

4. The system for dynamic selection of transmission resources according to claim 2, wherein the base station and the mobile terminal are each configured to estimate the transmission qualify index of the selected certain transmission resource from a prediction function having the state of the first counter of the base station and the state of the first counter of the mobile, terminal corresponding to the selected certain transmission resource as predictive variables, the prediction function being identical for the base station and for the mobile terminal.

5. The system for dynamic selection of transmission resources according to claim 1, wherein each of the base station and the mobile terminal has at least one second counter associated with the each transmission resource of the plurality of transmission resources, the transmission quality index of the selected certain transmission resource being estimated at the base station and at the mobile terminal from a prediction function having the state of the first counter of the base station the state of the first counter of the mobile terminal, a state of a second counter of the base station, and a state of a second counter of the mobile terminal, as predictive variables.

6. The system for dynamic selection of transmission resources according to claim 5, wherein:
    when the base station determines that the selected certain transmission resource is not available, the base station is configured to increment the second counter of the base station corresponding to the selected certain transmission resource;

when the mobile terminal determines that the beacon signal is not present on the selected certain transmission resource, the mobile terminal is configured to increment the second counter of the mobile terminal corresponding to the selected certain transmission resource.

7. The system for dynamic selection of transmission resources according to claim 6, wherein the base station and the mobile terminal are each configured to calculate the transmission quality index of the selected certain transmission resource as $$\frac{C1}{C1+C2}$$

which $C_1$ is the state of the first counter of the base station and the state of the first counter of the mobile terminal corresponding to the selected certain transmission resource, and $C_2$ is the state of the second counter of the base station and the state of the second counter of the mobile terminal corresponding to the selected certain transmission resource.

8. The system for dynamic selection of transmission resources according to claim 6, wherein the base station and the mobile terminal are each configured to calculate the transmission quality index of the selected certain transmission resource as $$\frac{C1}{C1+C2}+\alpha\sqrt{\frac{\log t}{C1+C2}}$$

in which $C_1$ is the state of the first counter of the base station and the state of the first counter of the mobile terminal and $C_2$ is the state of the second counter of the base station and the state of the second counter of the mobile, terminal corresponding to the selected certain transmission resource, $\alpha$ is a positive parameter, and t is a temporal index incremented at each superframe.

9. The system for dynamic selection of transmission resources according to claim 1, wherein when the base station or the mobile terminal determine that an error rate on the selected certain transmission resource is higher than a predetermined threshold value, the base station or the mobile terminal is configured to increment a particular second counter associated with the selected certain transmission resource.

10. The system for dynamic selection of transmission resources according to claim 9, wherein the base station and the mobile terminal are each configured to calculate the transmission quality index of the selected certain transmission resource as $$\frac{C1}{C1+C'2}$$

in which $C_1$ is the state of the first counter of the base station and the state of the first counter of the mobile terminal corresponding to the selected certain transmission resource and $C'^2$ is a state of a second counter of the base station and a slate of a second counter of the mobile terminal corresponding to the selected certain transmission resource.

* * * * *